July 27, 1943.  V. L. MALLORY  2,325,258
LIGHTING SYSTEM
Filed Jan. 9, 1939  7 Sheets-Sheet 4

July 27, 1943.  V. L. MALLORY  2,325,258
LIGHTING SYSTEM
Filed Jan. 9, 1939  7 Sheets-Sheet 5

Inventor
Vernon L. Mallory.
By Lacey & Lacey,
Attorneys

July 27, 1943.　　　V. L. MALLORY　　　2,325,258
LIGHTING SYSTEM
Filed Jan. 9, 1939　　　7 Sheets-Sheet 6

July 27, 1943.  V. L. MALLORY  2,325,258
LIGHTING SYSTEM
Filed Jan. 9, 1939  7 Sheets-Sheet 7

Inventor
Vernon L. Mallory.
By Lacey & Lacey
Attorneys

Patented July 27, 1943

2,325,258

UNITED STATES PATENT OFFICE 2,325,258

LIGHTING SYSTEM

Vernon L. Mallory, San Antonio, Tex., assignor of seventy per cent to Selden S. Nye, Brownsville, Tex.

Application January 9, 1939, Serial No. 250,075

2 Claims. (Cl. 175—352)

This invention relates to an improved lighting system and seeks, as one of its principal objects, to provide a system of this character more particularly intended for use with airports and other aircraft landing fields, which will be operable from an airplane for turning on flood lights or boundary lights, or both, on said landing field, so that the services of an attendant may be dispensed with.

Another object of the invention is to provide a lighting system which, in one embodiment, will be set in operation by the sound of an airplane flying over apparatus employed.

Another object of the invention is to provide a lighting system which will be responsive to sound emanating from but one direction, so that it will not be placed in operation by thunder or other sources of non-directional sound.

As a further object, the invention contemplates a lighting system which, in a second embodiment, is operated by audio-modulated continuous waves transmitted from the airplane and received by receiving apparatus on the field.

A further object of the invention is to provide a system of this class employing means which may be used for rendering said system inoperative automatically after the elapse of a predetermined time period.

As a further object, the invention provides means for automatically selecting and lighting the proper runway on which the plane should land, in order that it may land against the wind, the runway being selected by the novel wind controlled selector employed.

Another object is to provide, in a lighting system, a selector which will be operative for indicating wind direction and variation so that if the wind changes direction while the pilot is landing the plane, he may change his course as may be necessary.

As a still further object, the invention provides a lighting system which, in addition to automatic operation, may be operated manually by an airport or field attendant.

As another object, the invention contemplates the use of an identification light source so that a pilot will be guided to fly near signal responsive apparatus for operating the system.

And still another object of the invention is to provide a photo-electric cell circuit which will be operative upon failure of the identification light source for turning on the boundary lights of the system.

Other objects of the invention will become apparent as the description proceeds.

Referring now to the drawings forming a part of my application.

Reference is now had to the accompanying drawings, wherein similar numerals will be seen to designate like parts throughout the various views.

Figure 5:
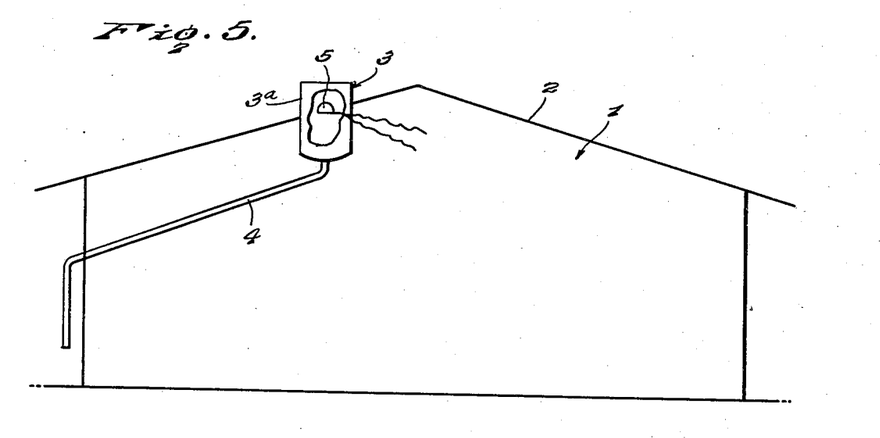
Figure 5 is a schematic view showing the location of the sound pick-up unit with respect to a hangar.
Figure 9:
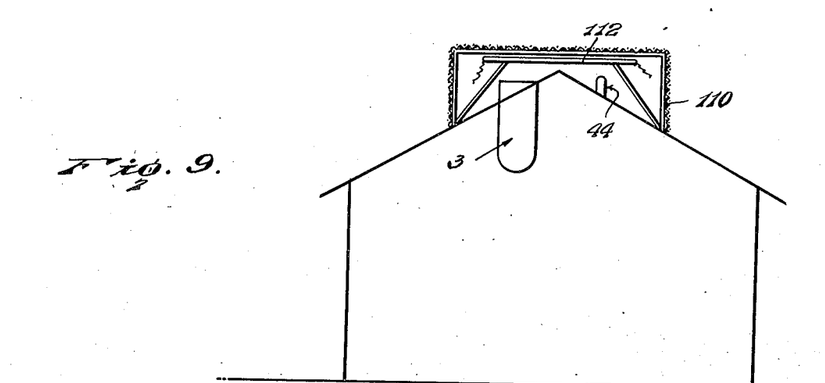
Figure 9 is a schematic view showing the identifying means suitably located, that is to say, on top of a hangar.
Figure 10:
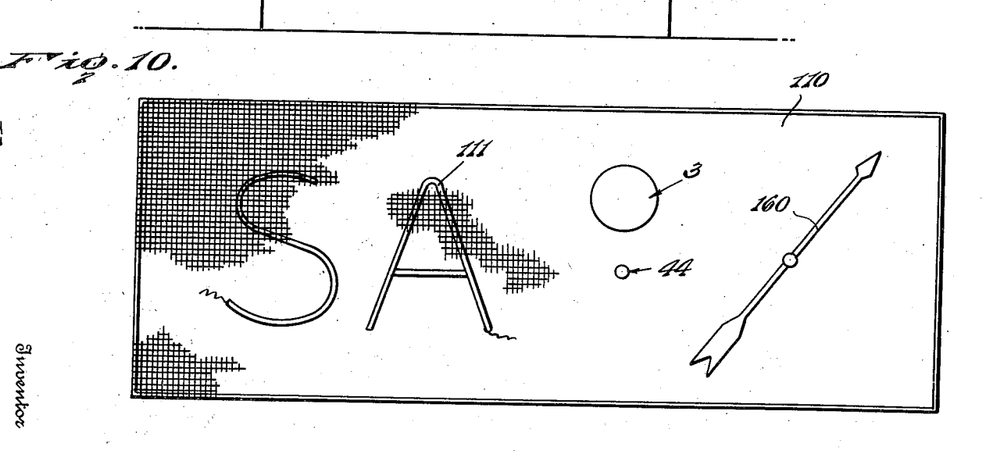
Figure 10 is a top plan view of the identifying means.

There will first be described the embodiment of the invention wherein operation of the lighting system is achieved by the transmission and reception of sound impulses from an airplane to receiving apparatus adjacent a flying field. This embodiment of the invention is best seen in Figures 5, 9 and 10 of the drawings, wherein is disclosed a hangar 1 having a roof 2. The hangar may be of any conventional construction and it is, of course, to be understood that the sound pick-up units, to be described hereinafter, may be mounted in any desired location. For the sake of convenience, however, one of the units is shown as mounted on the roof 2 of the hangar 1. The other sound pick-up unit or units should be mounted in a hangar or other building, or in any other convenient location, a substantial distance away from the first unit, for reasons which will become apparent hereinafter.

Figure 3:
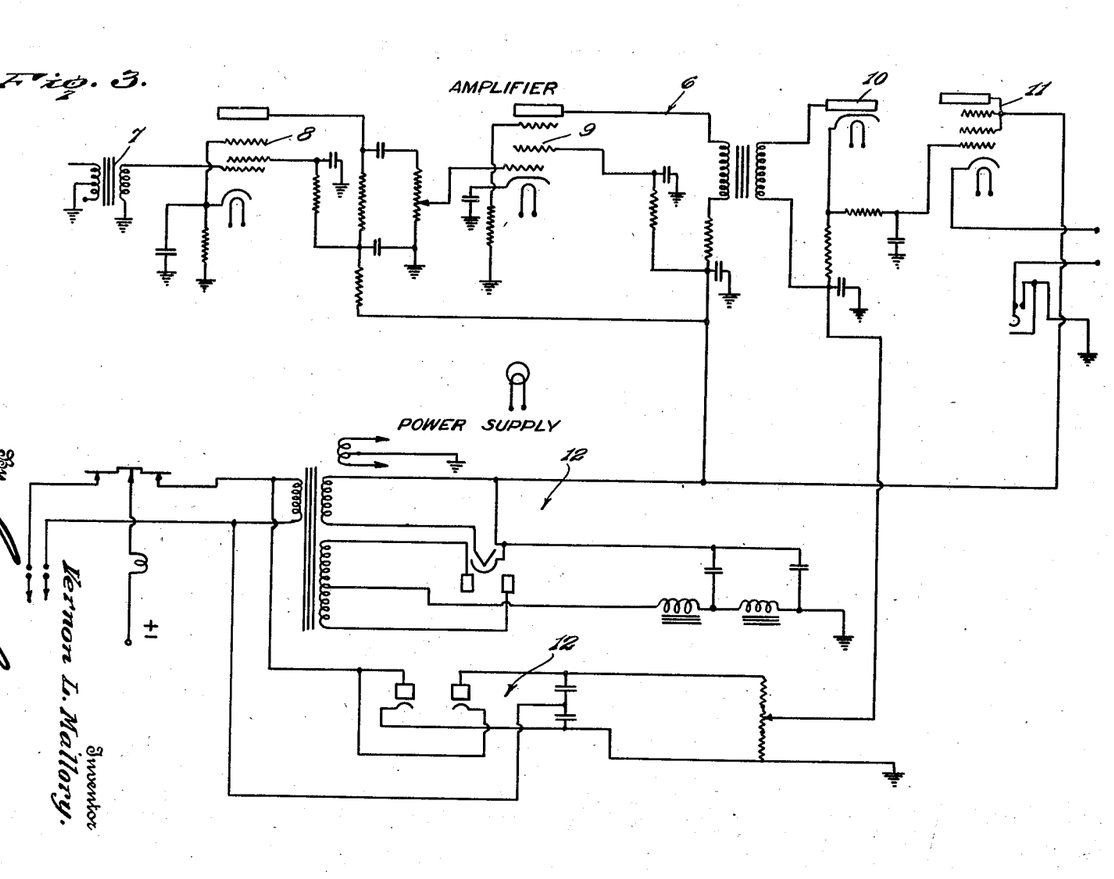
Figure 3 is a diagrammatic view of one of the audio-impulse amplifying units, with its power supply.

As shown in Figure 5 of the drawings, the pickup unit 3 includes a casing 3a mounted in the roof 2 of the hangar 1. The casing may be of metal or any other suitable material and is provided with a drain pipe 4 for draining off rain water entering the casing. Mounted in the casing 3a is a microphone, shown schematically at 5. The microphone is electrically connected with an audio-impulse amplifier unit shown at 6, in Figure 1. The amplifier unit is of conventional design but, nevertheless, is illustrated in Figure 3 of the drawings. The unit comprises a coupling transformer 7 and connected therewith in cascade is a plurality of vacuum tubes 8, 9, 10 and 11. The amplifier unit 6 includes a duplex power source 12. As the circuit details of the amplifier unit are conventional and may be varied to suit conditions, it is not thought necessary to describe them herein.

Figure 1:
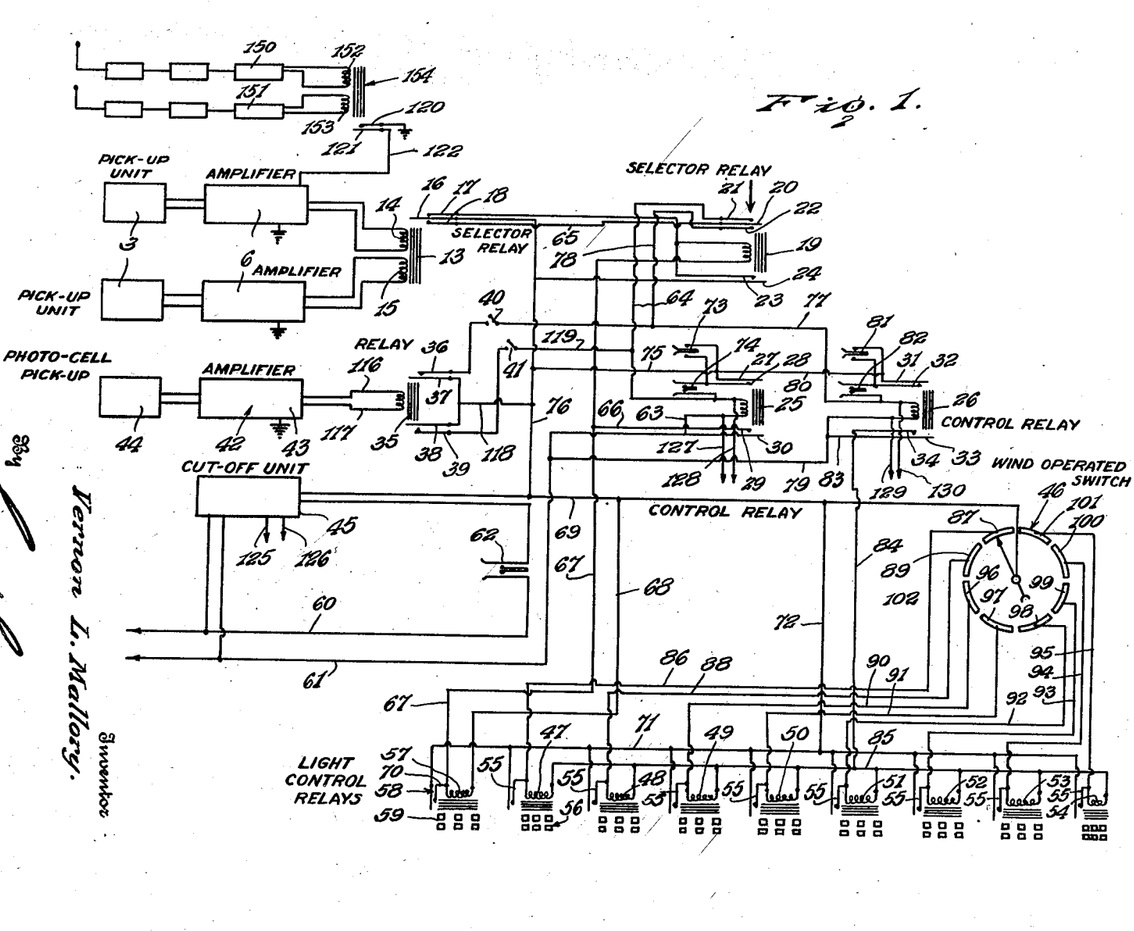
Figure 1 is a diagrammatic view showing my lighting system complete.

As heretofore stated, at least two of the pick-up units 3 are employed and they are spaced a substantial distance apart. That is to say, one of the units 3 may be placed at one end of the landing field or airport while the other may be placed at the opposite end thereof. Each of the pickup units is connected with an amplifier unit 6 and, if necessary, suitable pre-amplifiers may be interposed in the circuit between the pick-up units 3 and said amplifier units 6 in order to give sufficient gain for proper input to said amplifier units. At 13 is shown a dual output relay of the opposed coil type. The relay 13 includes a coil 14 which is electrically connected to the output of one of the amplifier units 6 and a coil 15 connected to the output of the other of said units 3. It will be understood that the audio-impulses set up by the motor of an airplane flying over one of the pick-up units will be converted into electrical impulses and amplified to the extent that one of the relay coils 14 or 15 will be energized. Contacts, to be described in detail hereinafter, will be closed by the energization of one or the other of the coils 14 and 15. Should a non-directional audio disturbance, such for instance as a roll of thunder, take place, both of the pickup units 3 will receive a like amount of audio-impulses and the amplifier units 6 will both be operated for energizing both the coils 14 and 15 simultaneously. Under such conditions, the coil 14 will oppose the coil 15 and closing of the contacts of the relay will not take place.

The relay includes an armature 16 and contact springs 17 and 18. For purposes of clarity, it is believed advisable to indicate the other relays and elements which take a prominent part in the operation of this invention. With this in view, a selector relay is shown generally at 19 and includes an armature 20 having contacts 21 and 22 associated therewith. Maintaining contacts are shown at 23 and 24. Control relays 25 and 26 are employed. The relay 25 includes contacts 27, 28, 29 and 30 while the relay 26 has contacts 31, 32, 33 and 34. A photo-cell unit operated relay 35 has contacts 36, 37, 38 and 39 associated therewith. Selector switches 40 and 41 are connected with the relay 35 and will be described in more detail hereinafter. The photo-cell unit operated relay 35 is adapted to be operated by a photo-cell 42 including an amplifier 43 and a photo-cell pick-up 44. For automatically returning the system to inoperative position after a plane has landed or flown from the field, as the case may be, an automatic cut-off unit 45 is provided. The unit 45 will be described in more detail hereinafter as will be the photo-cell unit 42.

At 46 is shown a wind operated selector switch which is operable for controlling current flow to magnetic switches 47, 48, 49, 50, 51, 52, 53 and 54. Each of the magnetic switches has a set of maintaining contacts 55, the purpose of which will be hereinafter set forth. Contacts for operating the lights themselves are shown generally at 56 in each of the magnetic switches. Wiring to the lights will be conventional and need not be described. The magnetic switches 47 through 54 are operable for controlling electric current to flood lights while boundary lights are to be controlled by a magnetic switch 57. The switch 57 has maintaining contacts 58 and control contacts 59.

A pair of electric current conductors are shown at 60 and 61 and are connected with a suitable power source. The conductor 60 is connected through a manually operated master switch 62 and through the automatic cut-off unit 45 to the armature 16. The conductor 61 is connected to one terminal of the coil of the control relay 25 by a conductor 63. The other terminal of the coil 25 is connected with the contact 21 of the selector relay 19 by a conductor 64. The armature 20 of the selector relay 19 is connected with the contact 18 by means of a conductor 65. It will now be understood that, upon energization of either of the coils 14 or 15, the current from the current source flowing through the conductors 60 and 61 will be led to the coil of the control relay 25. It should be understood that the selector relay 19 is de-energized and that the contacts 20 and 21 are engaged. The relay 25 will thus be energized for closing the contacts 29 and 30. Current will be led from the conductor 61 through a conductor 66 and through a conductor 67 to one terminal of the magnetic switch 57. The other terminal of said switch 57 is connected by conductors 68 and 69 to the other power conductor 60. The switch 57 will thus be energized for lighting the boundary lights on the landing field. In order to maintain the energization of the switch 57, after the initial energization thereof, certain circuit connections are necessary for the contacts 58. One of the contacts 58 is connected with the conductor 67 by a conductor 70 while the other of said contacts 58 is connected with the conductor 71 which is, in turn, connected by a conductor 72 with the conductor 69. Closing of the contacts 58 will thus insure energization of the switch 57 after initial energization in the manner hereinbefore described.

In order to maintain energization of the control relay 25 after initial energization thereof, the contacts 27 and 28 are closed. These contacts are electrically connected through switches 73 and 74 with a conductor 75 connected with a conductor 76 which is a continuation of the conductor 60.

Either the boundary lights, controlled by the magnet switch 57, or the flood lights, controlled by the magnet switches 47 through 54, or both, may be turned on by an approaching airplane in following manner:

If the plane were to fly over both of the sound pick-up units 3, or one of said units twice, the flood lights would be turned on, it being understood that the boundary lights will be turned on by the sound of the motor of the plane as it flies over in the first instance. It should be borne in mind that this selective effect is necessary for the reason that some airplane pilots do not like to land with flood lights. The selective effect is accomplished in the following manner:

When the control relay 25 is energized for supplying current to the switch 57, current will also be led to the selector relay 19. The circuit to the relay 19 will be complete only after the relay 13 has been returned to normal inoperative position. The contacts 23 and 24 will close upon energization of the relay 19 for maintaining said relay energized. The contacts 20 and 22 are closed for transmitting the voltage to one terminal of the coil of the relay 26 for the next period of operation of one of the sound pick-up units 3. A conductor 77 leads the current from the contact 22 through a conductor 78 to the terminal of the coil of said relay 26. The other terminal of the coil of the relay 26 is connected to the conductor 61 by means of a conductor 79. The contacts 31 and 32 are closed upon energization of the relay 26 and serve to maintain said relay energized after initial energization. A conductor 80 leads current from the conductor 76 (60) to the contact 31. Switches 81 and 82 are manually operable for energizing or de-energizing the relay 26. The contacts 33 and 34 are, of course, closed by energization of the relay 26. The contact 33 is connected by a conductor 83 with the conductor 79 and thus with the conductor 61. The contact 34 is connected by a conductor 84 with a conductor 85 which is connected to corresponding terminals of the magnetic switches 47 through 54. The other corresponding terminals of the switches 47 through 54 are each connected to a segment on the selector switch 46. In more detail, a conductor 86 connects the other corresponding terminal of the switch 47 with the segment 87 on the switch 46. A conductor 88 connects the other corresponding terminal of the switch 48 with a segment 89 on the switch 46. In like manner, the other corresponding terminals of the switches 49 through 54 are connected respectively by conductors 90, 91, 92, 93, 94 and 95 to segments 96, 97, 98, 99, 100 and 101.

Figure 6:
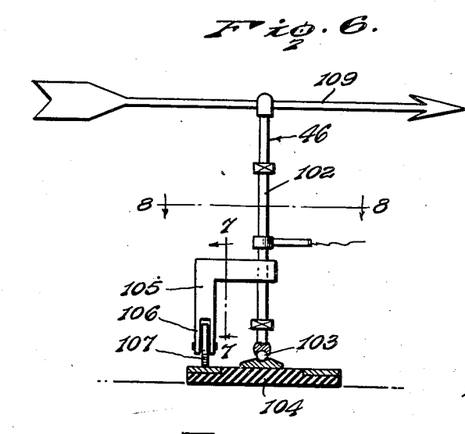
Figure 6 is a plan view of the wind controlled selector mechanism.
Figure 7:
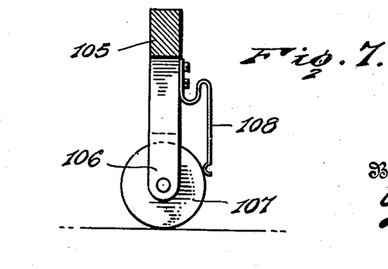
Figure 7 is a detail vertical sectional view on the line 7—7 of Figure 6, looking in the direction indicated by the arrows.
Figure 8:
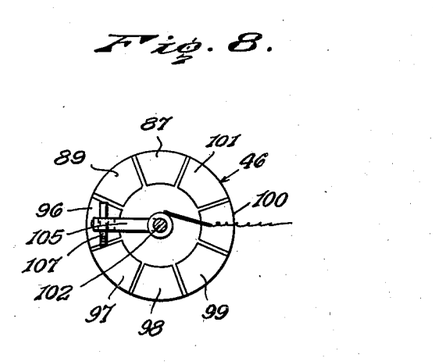
Figure 8 is a horizontal sectional view on the line 8—8 of Figure 6, looking in the direction indicated by the arrows.

The details of the switch are best seen in Figures 6, 7, and 8 of the drawings. A selector staff 102 is mounted in a bearing 103 on a base disc 104 which carries the segments 87, 89, and 96 through 101. A selector arm is shown at 105. The selector arm is of inverted L-shape and has a yoke 106 which receives a collector wheel 107 adapted to roll over the segments. A collector spring 108 is carried by the arm 105 and engages the wheel 107 for insuring proper contact.

A weather vane 109 is carried at the upper end of the staff 102 and is adapted to have a flow of wind impinge against the feathered end thereof for shifting the vane, staff and selector arm. It should be understood that the segments will be calibrated with the vane so that when the wind is blowing from a particular direction, certain flood lights will be illuminated to define a runway which will indicate to the plane pilot the proper direction to land. That is to say, it is obviously important that the plane land against the wind. For this reason the landing field is provided with a plurality of runways and means are provided for lighting each runway individually by flood lights placed at the head of the runway. In my improved lighting system, the proper runway for the safest landing is selected by the wind operated selector switch as heretofore described. The pilot will understand that he should approach the lighted runway from behind the flood lights so that he will thus land into the wind. By virtue of the fact that the maintaining contacts 55 are provided for each of the switches 47 through 54, said switches will be interlocked in such a manner that should the wind shift direction, the first runway selected by the switch 46 will remain lighted and additional runways will be lighted as the switch moves in response to wind blowing from other directions. This will have the effect of indicating to the pilot that the wind is variable in direction and thus blowing in a direction midway between two lighted runways, in which case the pilot obviously should choose the longest runway.

In order that an airplane pilot desiring to land his plane on a landing field equipped with my improved lighting system, may properly identify the sound pick-up units, I provide a screen 110, best seen in Figures 9 and 10 of the drawings. The screen is adapted to be mounted above the pick-up units and has mounted thereunder a sign 111 which may be of the neon gas type or of any other suitable construction. In the example illustrated in Figure 10, the sign 111 embodies large letters which may be seen by the pilot. These letters may indicate the name or the initial of the town or location of the field. The screen 110 serves to protect the sign 111 and the sound pick-up units thereunder from hail or other objects or precipitation. The sign may be energized from any suitable source. Moreover, the screen 110 can conveniently form a background for a vane 160 so that the pilot may better see the direction in which the vane is pointed with respect to surrounding objects. The photoelectric cell pick-up unit 44 is located beneath the sign 111 and in the path of the beams of light from said sign. While I have only shown one of the screens 110, it should be understood that a screen is provided for each of the sound and photo-cell pick-up units and for each of the signs. As heretofore stated, it is only necessary that the pick-up units and signs be positioned so that they may be conveniently located by the pilots to permit them to fly in sufficient proximity to the units and signs to effect proper functioning of the units.

Figure 2:
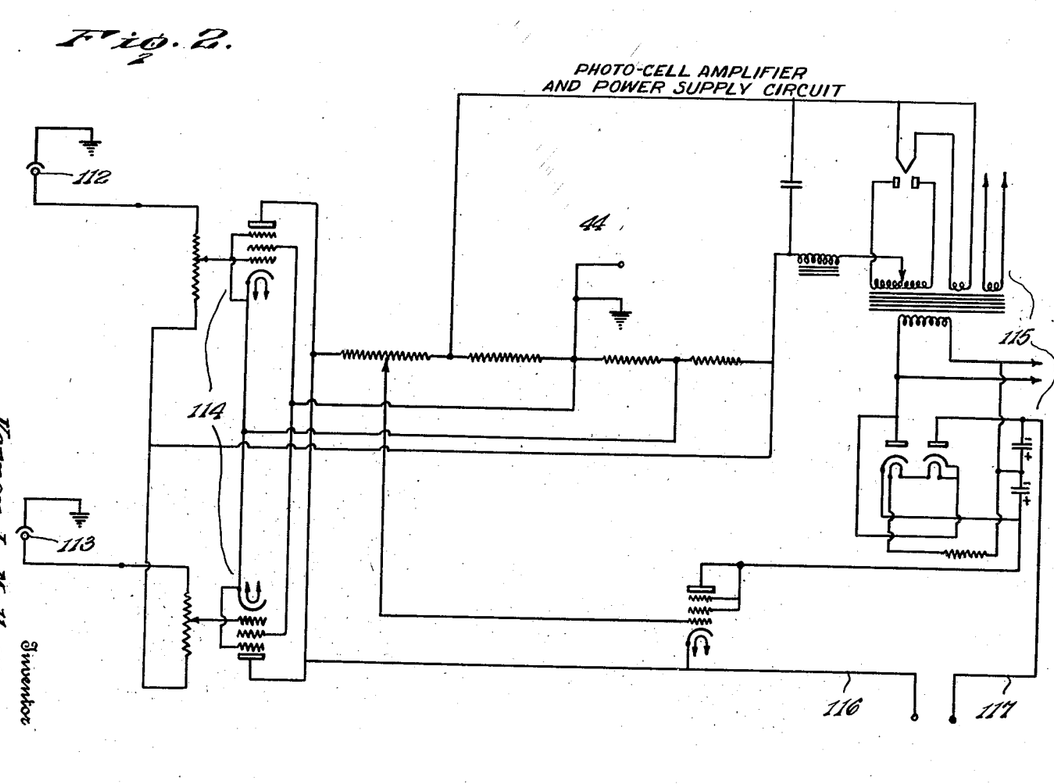
Figure 2 is a diagrammatic view of the photo-cell and amplifying unit therefor.

The photo-cell unit 44 is shown in Figure 2 of the drawings, complete. That is to say, a pair of photo-electric cells are shown connected in series and with the voltage amplifier which magnifies the impulses to the extent that they will operate the relay 35. It should be understood that the equipment may be located a desired distance from the photo-electric cells and that pre-amplifiers may be used where necessary. The photo-electric cells are shown at 112 and 113 in Figure 2 of the drawings. The amplifier is shown at 114. A duplex power supply is shown at 115 and is connected with the amplifier in a conventional manner. As in the case of the audio-impulse amplifier, variations in certain arrangements are quite possible and, in fact, so frequent that only a typical circuit arrangement has been shown. The output of the amplifier is led by conductors 116 and 117 to the magnet coil of the magnet 35. It will be readily understood that the usefulness of the system would be greatly curtailed should the sign or indicating light 111 become inoperative, for the reason that the pilot might be unable to locate the pick-up units. Therefore, in the event the sign 111 should not be illuminated, current flowing through the photo-electric cells will be greatly reduced. This will result in varying of the grid bias voltage in the amplifier 114. Consequently, increase in plate current of the output tube will result and the relay 35 will be energized.

Upon energization of the relay 35, the contacts 36 and 37 will be engaged as will be the contacts 38 and 39. The contacts 37 and 38 are connected by a common conductor 118 to the conductor 76. The conductor 36 is connected through the switch 40 and through the conductor 77 to the coil of the relay 26 while the conductor 39 is connected through the switch 41 to a conductor 119 and the conductor 64 to the coil of the control relay 25. Therefore, if the switch 40 is closed, current will flow from the current source through the conductors 60, 76, 118, through the contacts 36 and 37, through the switch 40, and conductor 77, to the control relay 26. The flood lights will be lighted for the runway connected by the selector switch 46 and the magnetic switch in circuit therewith, depending upon the direction of the wind. Should it be desired to light the boundary lights only or to light the boundary lights in addition to the flood lights, the switch 41 is closed. Current will then flow from the conductor 76, in the manner previously described, through the conductor 118, through the contacts 38 and 39, through the switch 41, through the conductor 119, through the conductor 64, and to the control relay 25. The magnetic switch will be energized to illuminate the boundary lights.

Figure 11:
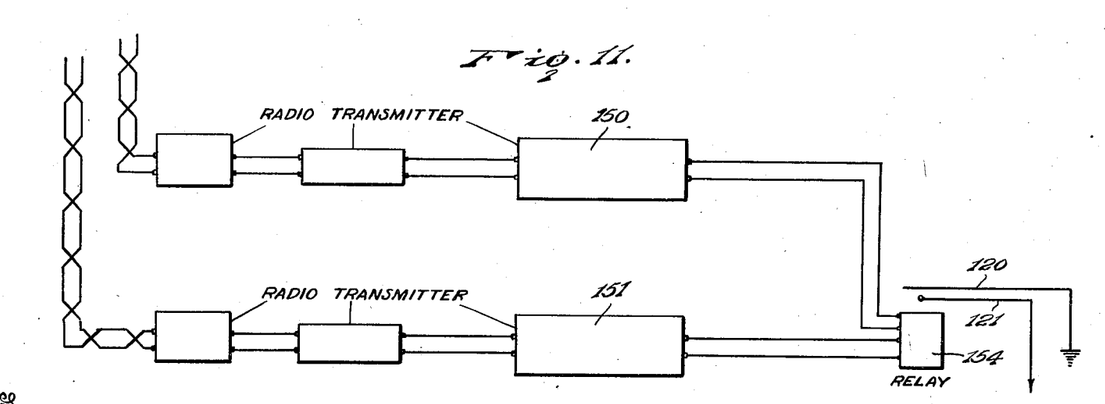
Figure 11 is a diagrammatic view showing the receiving units employed.
Figure 12:
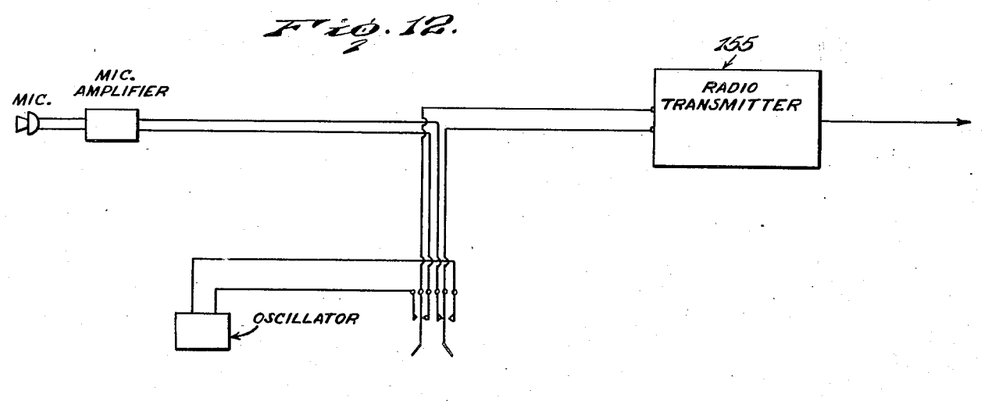
Figure 12 is a diagrammatic view showing a suitable transmitting apparatus for operation in conjunction with the receiving unit shown in Figure 11.

The description of the invention up to the present has related to the operation of the system by the sound of the motor of an airplane flying overhead. There will now be described that part of the system whereby a radio transmitter in the airplane will be operative for sending continuous electro-magnetic waves to pick-up units 150 and 151 for selectively energizing the coils 152 and 153 of the magnet 154. The receiving and transmitting units are shown, respectively, in Figures 11 and 12 of the drawings. The units 150 and 151 are of conventional design and are preferably of the superheterodyne variety, as this type of receiver is more selective than other types known. The receivers are tuned to respond to different frequencies and, in order to cause operation of the magnet 154 connected with the receivers, it is necessary that the transmitted signal be on the frequency of one or the other of the receivers. It has been found that the use of two radio receiving sets is highly advantageous for the reason that, not only is it possible to operate the system by the use of either of two different frequencies, but, also, the possibility of the system being operated by static is eliminated. That is to say, the units 150 and 151 are connected to the coils 152 and 153, which are of the opposed current type. Should an operating signal be received by one of the receivers, the coil connected therewith will be energized for operating the relay and thus the system. Should a burst of static or other interference be set up in the atmosphere, both receiving units would be operated. Both of the coils 152 and 153 would be energized and would oppose each other so that the relay 154 would remain inoperative. Contacts 120 and 121, and a conductor 122 connect the relay 154 with one of the units so that selective opertaion of the radio units will cause operation of the relay 13. The transmitter unit, shown generally at 155, is of any suitable design.

Let it be understood here that the radio equipment now in use in a large number of airplanes could be used for this purpose with minor alterations. That is to say, if a cut-off filter, designed to cut off all frequencies above 2,000 cycles, be inserted in the audio circuit of the transmitter, and likewise a filter of the same nature be inserted in the communications receiver, then regular communication could be maintained without operating the lighting equipment, providing that the receivers that operate the lighting equipment have a band-pass filter designed to pass some frequency above 2,000 cycles, for example, 5,000 cycles. Then when a 5,000 cycle signal is modulated on the transmitter it will operate the lighting equipment without being heard on the communications receiver.

There will now be described the cut-off unit employed. That is to say, in the event the pilot of an airplane, after causing the plane to actuate the system, should decide not to land, or in the event that the plane should land, the lights of the field would be automatically cut off by this cut-off unit unless previously extinguished manually by the master switch 62 or by certain of the other switches. The cut-off unit is shown generally at 45 in Figure 1 of the drawings, and is shown in detail in Figure 4. The cut-off unit includes input terminals 125 and 126 which are adapted to be connected either with terminals 127 and 128 of the control relay 25, or terminals 129 and 130 of the control relay 26. If desired, a double throw switch may be employed for selecting either of the relays 25 or 26 to be connected with the cut-off unit. It will be noted that the terminals 127 and 128 and the terminals 129 and 130 are respectively connected across the control relays 25 and 26. If the time period for lighting the field is to run from the instant the boundary lights, controlled by the magnetic switch 57, are lighted, connection is made to the relay 25. Otherwise, connection is made to the coil of the relay 26, which will start the time period from the time the flood lights are lighted. In either event, a relay 131, having contacts 132, 133, 134, and a second set of contacts 135 and 136, is energized from the relay 25 or the relay 26. Energization of the relay 131 will close the contacts 135 and 136 so that a relay 137 is energized and contacts 138 and 139 closed. The relay 137 is maintained energized so that, should current flowing to the relay 131 be interrupted, energization of the relay 137 will be maintained. Upon closing of the contacts 135 and 136 of the relay 131, a motor 140, pivotally mounted on a frame 141, is started, said motor being connected in parallel with the coil of the relay 137 by conductors 142 and 143. A cam shaft 144 is mounted on the frame 141 and is driven by semi-frictional rotating members 145 and 146. The cam shaft is supported at its opposite end portions by uprights 147 and 148 on the frame. Mounted on the cam shaft 144 are cams 149 and 150. The cam 149 is adapted to open and close contacts 151 and 152 while the cam 150 is operable for opening and closing contacts 153 and 154. The contacts 151 and 152 are mounted on a disc 155 of insulating material rotatably mounted on the cam shaft 144. An upstanding stud 156 has a locking screw 157 screwed therethrough. The locking screw is operable for clamping the edge portion of the disc 155 against a stop finger 158. It will be seen that the disc may be rotated to any desired position for varying the time required for the cam 149 to open and close the contacts. On the cam shaft 144 is fixed a stop pin 159 which is engageable with a stop lug 160, for limiting rotative movement of the cam shaft. A coil spring 161 has one end secured to the shaft 144 and the other end secured to the base 141. The spring 161 is operable for returning the cam shaft to a raised position after operation. A motor solenoid 162 is energizable for shifting the motor out of frictional engagement with the cam shaft.

Figure 4:
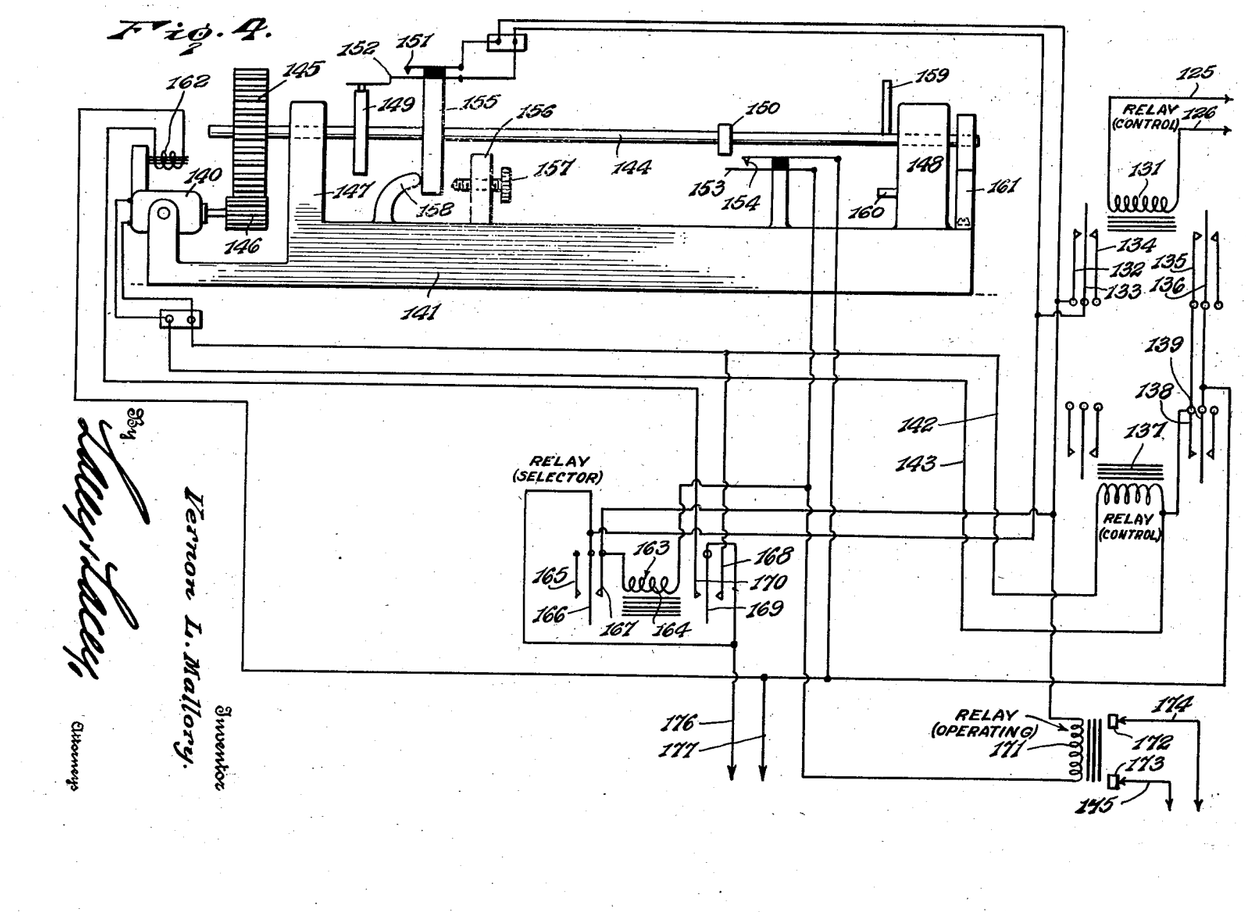
Figure 4 is a diagrammatic view, a portion of the apparatus being shown in elevation, of the automatic cut-off unit.

At 163 is shown a relay which has a coil 164 and contacts 165, 166, 167 and a second set of contacts 168, 169 and 170. Rotation of the cam 149 will close the contacts 151 and 152. The coil 164 and relay 163 are energized and maintained energized by the closing of the contacts 166 and 167. The contacts 168 and 169 are similarly connected by energization of the relay 163 so that the relay 137 is deenergized. The motor is stopped. Similarly, contacts 169 and 170 are closed for energizing the solenoid 162 which shifts the motor and disengages the frictional connection between the members 145 and 146. The cam shaft 144 will be freed and the spring 161, which has been wound during the period of rotation of the cam shaft, will return the shaft to normal position. The contacts 151 and 152 will be opened but this action is of no consequence since the relay 163 has been maintained energized by closing of the contacts 166 and 167. The contacts 153 and 154 will be opened, with the return of the shaft to normal position, by the cam 150. This, in turn, opens a circuit so that the relay 163 is deenergized. The relay 163, being de-energized, permits the solenoid 162 to become de-energized so that the shaft of the driving motor is allowed to return to driving position.

At 171 is shown a fourth relay which is energized during the period of energization of the relay 163, due to the fact that the relay 171 is connected in parallel with said relay 163. The relay 171 has contacts 172 and 173 which are held open by energization of the coil of the relay 171. During the period of time that the contacts 172 and 173 are held open, the circuit to the system through the conductors 174 and 175 is maintained inoperative.

The purpose of the contacts 132 and 133 of the relay 131 will now be explained. Let it be assumed that the controlled lights have been turned on either automatically or manually. The automatic cut-off unit is now in operation. Let it be assumed that the lights have been cut off manually which stops current flow through the coil of the relay 131. Upon de-energization of the relay 131, the contacts 132 and 133 are closed and, being connected in parallel with the contacts 151 and 152, have the same effect as the closing of these latter mentioned contacts. The entire mechanism is thus returned to inoperative position. The source of current supply for operating the motor 140 and the various relays in the cut-off unit is led by conductors 176 and 177 from the conductors 60 and 61. As the conductors themselves are of conventional design, it is not thought necessary to describe the connections in detail, the manner of connecting the various components having been set forth hereinbefore.

It is believed that the construction and operation of my improved lighting system will now be thoroughly understood. It will be readily seen that this lighting system may be used effectively on an emergency or other landing field where the usual lighting means are not available, by the use of automatic engine driven generators and storage batteries, the batteries being charged automatically periodically whenever needed. Further description of the invention is thought to be unnecessary.

Having thus described the invention, what is claimed is:

1. In a system of the class described, in combination with boundary lights and flood lights for an airport and a source of audio frequency impulses, an impulse responsive unit responsive to uni-directional impulses and including a relay having a pair of coils connected so that energizing current will produce fields in opposite directions, a current source, a selector relay operatively connected with the first-mentioned relay and having contacts, a pair of control relays having contacts, said control relays being operatively connected with the selector relay, a magnetic switch for controlling current flow to the boundary lights, said switch being connected with one of the control relays, and a magnetic switch for controlling current flow to the airport flood lights, said switch being connected to the other of said control relays, said selector relay being initially energizable for connecting the first-mentioned control relay in the circuit whereby the first-mentioned magnetic switch will be operated for closing the circuit to the airport boundary lights, said selector relay being secondarily energizable for actuating the second-mentioned control relay for energizing the airport flood lights.

2. In a system of the class described, in combination with boundary lights and flood lights for an airport, and a source of audio frequency impulses, an impulse responsive unit responsive to uni-directional impulses and including a relay having a pair of coils connected so that energizing current will produce fields in opposite directions, a current source, a selector relay operatively connected with the first-mentioned relay and having contacts, a pair of control relays having contacts, said control relays being operatively connected with the selector relay, a magnetic switch for controlling current flow to the boundary lights, said switch being connected with one of the control relays, a magnetic switch for controlling current to the airport flood lights, said switch being connected to the other of said control relays, said selector relay being initially energizable for connecting the first-mentioned control relay in the circuit whereby the first-mentioned magnetic switch will be operated for closing the circuit to the airport boundary lights, said selector relay being secondarily energizable for actuating the second-mentioned control relay for energizing the airport flood lights, and means for returning the system to inoperative position and ready for subsequent operation upon the passage of a predetermined period of time.

VERNON L. MALLORY.